US012583155B2

(12) United States Patent
Tsutsumi et al.

(10) Patent No.: US 12,583,155 B2
(45) Date of Patent: Mar. 24, 2026

(54) CONTROL DEVICE FOR INJECTION MOLDING MACHINE AND CONTROL METHOD FOR INJECTION MOLDING MACHINE

(71) Applicant: SUMITOMO HEAVY INDUSTRIES, LTD., Tokyo (JP)

(72) Inventors: Yutaka Tsutsumi, Chiba (JP); Daigo Hotta, Chiba (JP); Shun Shibuya, Chiba (JP); Yuki Matsui, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 459 days.

(21) Appl. No.: 18/059,062

(22) Filed: Nov. 28, 2022

(65) Prior Publication Data

US 2023/0173722 A1      Jun. 8, 2023

(30) Foreign Application Priority Data

Dec. 3, 2021      (JP) ................................. 2021-196977

(51) Int. Cl.
　　*B29C 45/17*　　　(2006.01)
　　*B29C 45/77*　　　(2006.01)
(52) U.S. Cl.
　　CPC .......... *B29C 45/1734* (2013.01); *B29C 45/77* (2013.01); *B29C 2045/1739* (2013.01); *B29C 45/1774* (2013.01); *B29C 2945/7601* (2013.01)
(58) Field of Classification Search
　　CPC . B29C 45/1734; B29C 45/77; B29C 45/1774; B29C 2045/1739; B29C 2945/7601; B29C 45/5008; B29C 2045/7606; B29C 2945/76936; B29C 45/76; B29C 2945/7604; B29C 2945/76187; B29C 2945/7621; B29C 2945/76257; B29C 2945/76287; B29C 45/78; B29C 2945/76006; B29C 2945/76381; B29C 2945/76384; B29C 2945/76498; B29C 2945/76531; B29C 2945/76665; B29C 2945/76859; B29C 2945/76933; B29C 2945/76943

See application file for complete search history.

(56) References Cited

U.S. PATENT DOCUMENTS

| | | | |
|---|---|---|---|
| 5,419,858 A | 5/1995 | Hata et al. | |
| 2010/0044900 A1* | 2/2010 | Shikase | ................... B29C 45/78 |
| | | | 264/40.6 |
| 2016/0236392 A1* | 8/2016 | Aoyama | ............... B29C 45/768 |
| 2019/0070763 A1* | 3/2019 | Altonen | ................... B29C 45/78 |
| 2020/0156292 A1* | 5/2020 | Hannemann | ............ B29C 44/42 |

(Continued)

FOREIGN PATENT DOCUMENTS

| | | |
|---|---|---|
| JP | H05-147090 | 6/1993 |
| JP | H08-164545 | 6/1996 |

(Continued)

*Primary Examiner* — Rami R Okasha
(74) *Attorney, Agent, or Firm* — IPUSA, PLLC

(57) ABSTRACT

The present invention offers a technique for providing assistance in setting at least one of the temperature of a nozzle and the temperature of a cylinder. A control device for an injection molding machine includes a monitoring part configured to monitor, during a filling step of filling the inside of a mold device with a molding material, a change in the filling pressure acting on the molding material.

12 Claims, 6 Drawing Sheets

FILLING PRESSURE

0

0

TIME ELAPSED SINCE FILLING STEP STARTED

(56) References Cited

U.S. PATENT DOCUMENTS

| | | | | |
|---|---|---|---|---|
| 2020/0198201 | A1* | 6/2020 | Shimokusuzono | ... B29C 45/766 |
| 2021/0086424 | A1* | 3/2021 | Hakoda | .............. B29C 45/7613 |
| 2022/0024097 | A1* | 1/2022 | Maruyama | ........... B29C 64/209 |
| 2022/0388215 | A1 | 12/2022 | Yu et al. | |
| 2024/0239029 | A1* | 7/2024 | Okubo | ................... B29C 45/77 |

FOREIGN PATENT DOCUMENTS

| | | |
|---|---|---|
| JP | 2009-166299 | 7/2009 |
| JP | 2014-226890 | 12/2014 |
| JP | 2015-083352 | 4/2015 |
| KR | 10-2017-0048776 | 5/2017 |
| KR | 10-2021-0056235 | 5/2021 |

* cited by examiner

FIG.4

FILLING
PRESSURE

TIME ELAPSED SINCE FILLING STEP STARTED

FILLING
PRESSURE

TIME ELAPSED SINCE FILLING STEP STARTED

CONTROL DEVICE FOR INJECTION MOLDING MACHINE AND CONTROL METHOD FOR INJECTION MOLDING MACHINE

CROSS-REFERENCE TO RELATED APPLICATION

This application claims priority to Japanese Patent Application No. 2021-196977, filed on Dec. 3, 2021, the entire contents of which are incorporated herein by reference.

BACKGROUND

1. Field of the Invention

The present invention relates to a control device for an injection molding machine and a control method for the injection molding machine.

2. Description of the Related Art

An injection molding machine according to related art has a mold and an injection device. The mold includes a movable mold and a fixed mold, and a cavity is formed by these movable and fixed molds. The injection device includes a heat cylinder and a screw that is arranged in the heat cylinder. By moving the screw forward, melted resin inside the heat cylinder fills the cavity. According to related art, the mold is provided with an air vent in order to facilitate the discharge of the air inside the cavity and the gas produced from the melted resin to the outside of the mold. The screw is temporarily stopped during at least one of the filling step and the pressure-holding step.

SUMMARY

A control device for an injection molding machine according to one aspect of the present invention includes a monitoring part configured to monitor, during a filling step of filling the inside of a mold device with a molding material, a change in the filling pressure acting on the molding material.

According to one aspect of the present invention, it is possible to determine whether nozzle clogging is occurring or drooling is occurring by monitoring changes in the filling pressure during the filling step. As a result of this, it is possible to provide assistance in setting one of the temperature of the nozzle and the temperature of the cylinder.

BRIEF DESCRIPTION OF THE DRAWINGS

FIG. 4 is a diagram showing examples of processes in a molding cycle;

DETAILED DESCRIPTION OF EMBODIMENTS

Figure 1:
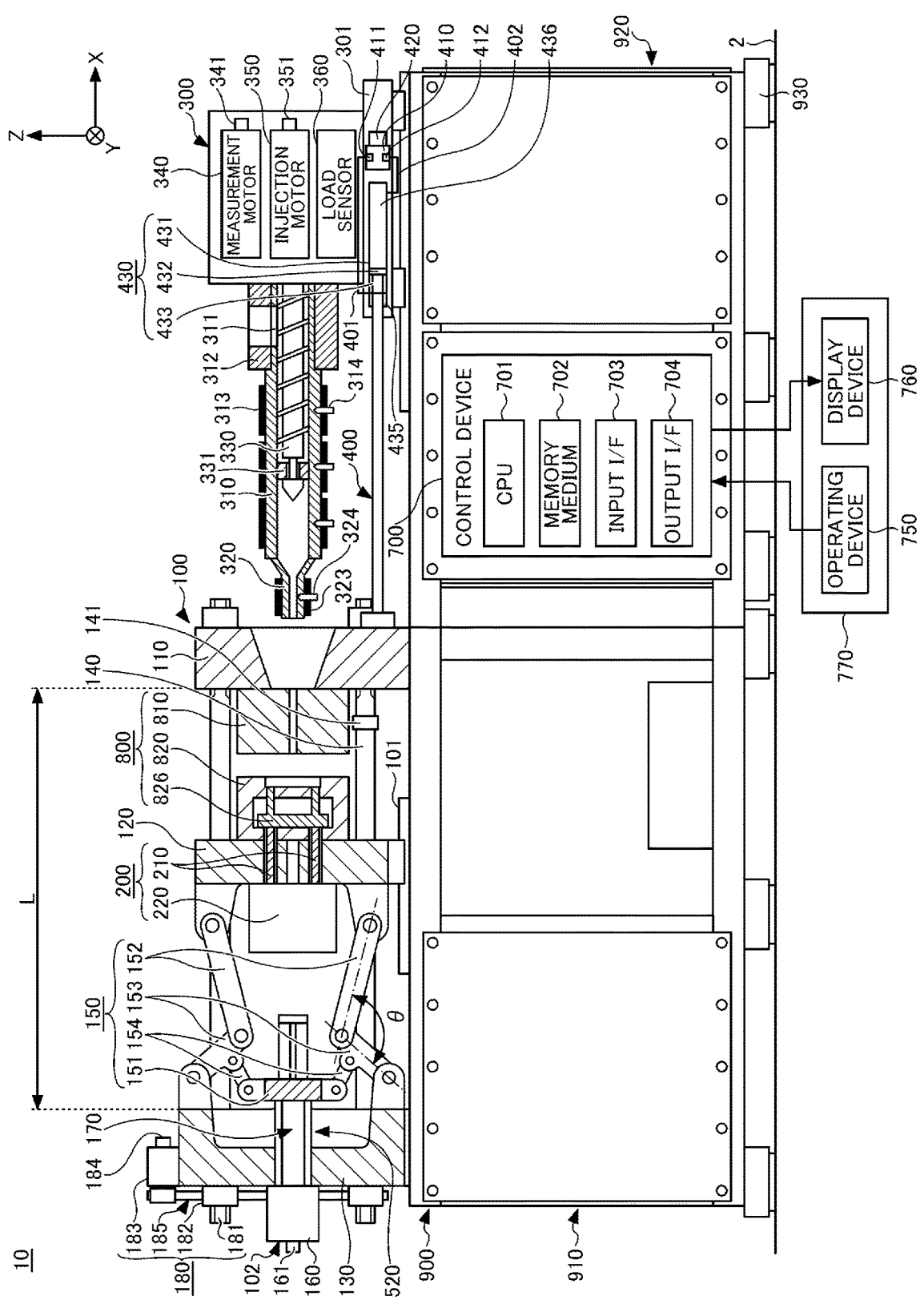
FIG. 1 is a diagram showing a mold of an injection molding machine according to one embodiment as being fully open.

Hereinafter, an embodiment of the present invention will be described with reference to the accompanying drawings. Note that, throughout the drawings, the same reference numerals may be assigned the same or corresponding codes, and the description thereof may be omitted.

An injection molding machine includes a cylinder that heats the molding material, and a nozzle that is provided at the tip of the cylinder and that injects the molding material heated by the cylinder into the mold device. When at least one of the nozzle and the cylinder has a temperature that is too low, nozzle clogging might occur. Nozzle clogging refers to a phenomenon in which the molding material M is not injected from the nozzle even when the filling step is started and the screw is moved forward. On the other hand, if at least one of the nozzle and the cylinder has a temperature that is too high, drooling might occur. Drooling refers to a phenomenon in which the molding material leaks from the nozzle, into the mold device, before the filling step starts.

Whether nozzle clogging occurs or drooling occurs is difficult to determine by inspecting the quality of molded products. Conventionally, the temperatures of the nozzle and the cylinder are set by a skilled worker based on his/her own experience, and it is difficult for an inexperienced worker to set the temperatures of the nozzle and the cylinder.

One aspect of the present invention therefore provides a technique for providing assistance in setting one of the temperature of the nozzle and the temperature of the cylinder.

(Injection Molding Machine)

Figure 2:
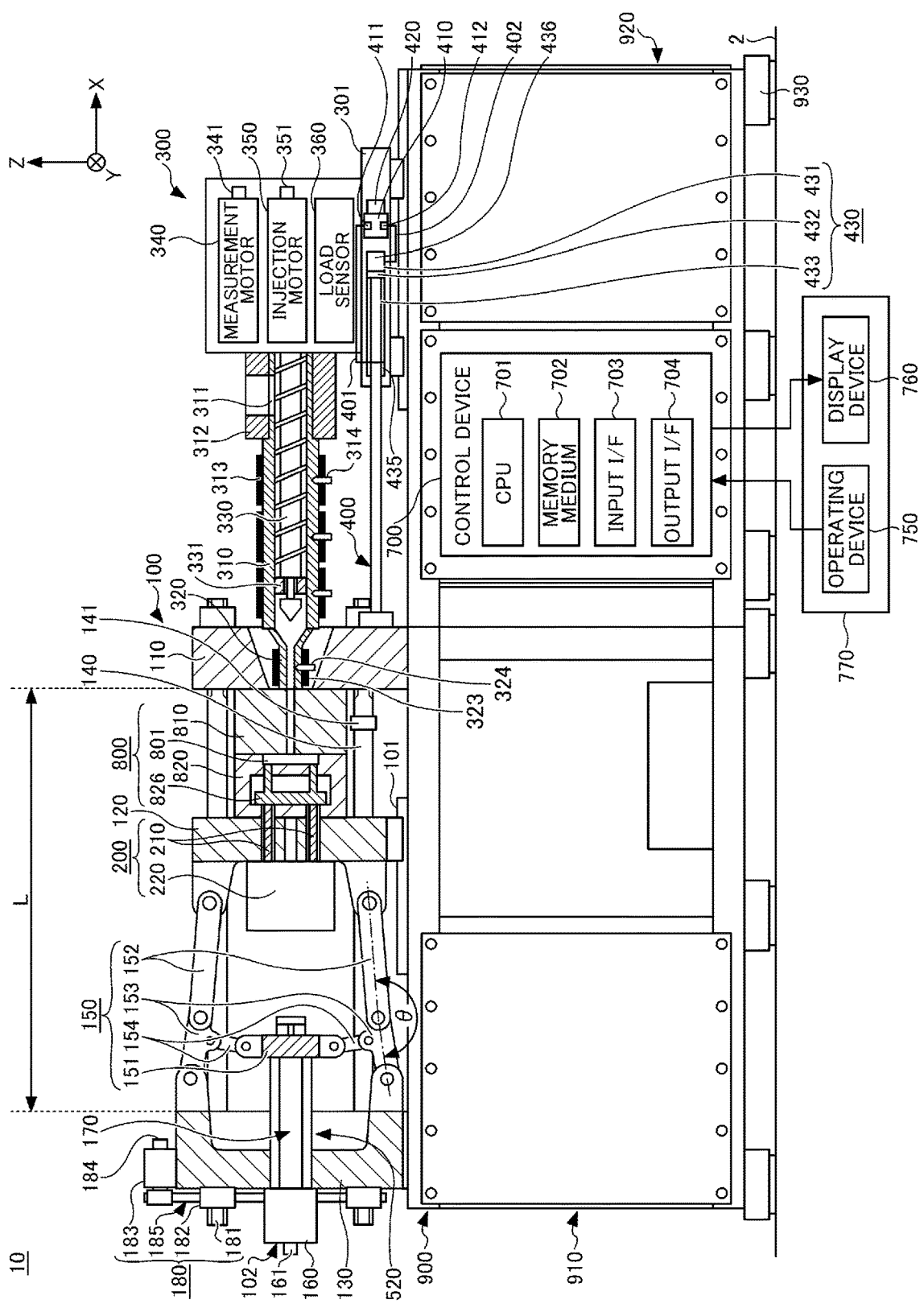
FIG. 2 is a diagram showing the mold of the injection molding machine according to one embodiment as being closed.

FIG. 1 is a diagram showing a state of an injection molding machine when a mold is fully open, according to one embodiment. FIG. 2 is a diagram showing the injection molding machine according to one embodiment, where the mold is clamped. In this specification, the X-axis direction, the Y-axis direction, and the Z-axis direction perpendicular to each other. The X-axis direction and the Y-axis direction represent the horizontal direction, and the Z-axis direction represents the vertical direction. When the clamping device 100 is a horizontal type, the X-axis direction is the direction in which the mold opens and closes, and the Y-axis direction is the width direction of the injection molding machine 10. The negative Y-axis direction side will be hereinafter referred to as "the operating side," and the positive Y-axis direction side will be referred to as "the non-operating side."

As shown in FIG. 1 and FIG. 2, the injection molding machine 10 includes: a clamping device 100 that opens and closes a mold device 800; an ejector device 200 that ejects the molded product molded by the mold device 800; an injection device 300 that injects the molding material into the mold device 800; a move device 400 that moves the injection device 300 forward and backward with respect to the mold device 800; a control device 700 that controls each component of the injection molding machine 10; and a frame 900 that supports each component of the injection molding machine 10. The frame 900 includes: a clamping device frame 910 that supports the clamping device 100; and an injection device frame 920 that supports the injection device 300. The clamping device frame 910 and the injection device frame 920 are each installed on a floor 2 via a leveling adjuster 930. The control device 700 is arranged in the inner space of the injection device frame 920. Each component of the injection molding machine 10 will be described below.

(Clamping Device)

In the description of the clamping device 100, the direction in which the movable platen 120 moves when closing the mold (for example, the positive X-axis direction) will be defined as the front, and the direction in which the movable platen 120 moves when opening the mold (for example, the negative X-axis direction) will be defined as the rear.

The clamping device 100 closes, pressurizes, clamps, depressurizes, and opens the mold device 800. The mold device 800 includes a fixed mold 810 and a movable mold 820.

The clamping device 100 is, for example, a horizontal type, and the direction in which the mold opens and closes is the horizontal direction. The clamping device 100 includes: a fixed platen 110 to which the fixed mold 810 is attached; a movable platen 120 to which the movable mold 820 is fixed; and a move mechanism 102 for moving the movable platen 120 with respect to the fixed platen 110 in the direction in which the mold opens and closes.

A fixed platen 110 is fixed to the clamping device frame 910. A fixed mold 810 is attached to the surface of the fixed platen 110 facing the movable platen 120.

The movable platen 120 is arranged on the clamping device frame 910 so as to be free to move in the direction in which the mold opens and closes. A guide 101 for guiding the movable platen 120 is laid on the clamping device frame 910. The movable mold 820 is attached to the surface of the movable platen 120 facing the fixed platen 110.

The move mechanism 102 moves the movable platen 120 forward and backward with respect to the fixed platen 110, thereby closing, pressurizing, clamping, depressurizing, and opening the mold of the mold device 800. The move mechanism 102 includes: a toggle support 130 that is arranged at a distance with respect to the fixed platen 110; a tie bar 140 that connects the fixed platen 110 and the toggle support 130; a toggle mechanism 150 that moves the movable platen 120 in the direction in which the mold opens and closes, with respect to the toggle support 130; a clamping motor 160 that activates the toggle mechanism 150; a motion conversion mechanism 170 that converts the rotational motion of the clamping motor 160 into linear motion; and a mold thickness adjusting mechanism 180 that adjusts the distance between the fixed platen 110 and the toggle support 130.

The toggle support 130 is provided at a distance from the fixed platen 110, and mounted on the clamping device frame 910 so as to be free to move in the direction in which the mold opens and closes. Note that the toggle support 130 may be arranged so as to be free to move along a guide laid on the clamping device frame 910. The guide for the toggle support 130 may be the same as the guide 101 for the movable platen 120.

Note that, with the present embodiment, the fixed platen 110 is fixed to the clamping device frame 910, and the toggle support 130 is arranged on the clamping device frame 910 so as to be free to move in the direction in which the mold opens and closes. However, it is equally possible to fix the toggle support 130 to the clamping device frame 910, and arrange the fixed platen 110 on the clamping device frame 910 so as to be free to move in the direction in which the mold opens and closes.

The tie bar 140 connects the fixed platen 110 and the toggle support 130 at a distance L in the direction in which the mold opens and closes. A plurality of (for example, four)

tie bars 140 may be used here. The multiple tie bars 140 are arranged parallel to the direction in which the mold opens and closes, and extend in accordance with the clamping force. At least one tie bar 140 may be provided with a tie bar strain sensor 141 that detects the strain of the tie bar 140. The tie-bar strain sensor 141 sends a signal indicating the detection result to the control device 700. The detection result of the tie-bar strain sensor 141 is used to detect the clamping force and the like.

Note that, with the present embodiment, the tie-bar strain sensor 141 is used as a clamping force sensor for detecting the clamping force, but the present invention is by no means limited to this. That is, the clamping force sensor is by no means limited to the strain gauge type, but may be a piezoelectric type, a capacitive type, a hydraulic type, an electromagnetic type, and so forth, and, furthermore, its mounting position is not limited to a tie bar 140 either.

The toggle mechanism 150 is arranged between the movable platen 120 and the toggle support 130, and moves the movable platen 120 in the direction in which the mold opens and closes, with respect to the toggle support 130. The toggle mechanism 150 includes a crosshead 151 that moves in the direction in which the mold opens and closes, and a pair of link sets that bend and stretch as the crosshead 151 moves. Each set of links includes first links 152 and second links 153 which are connected by using pins or the like so as to be free to bend and stretch. The first links 152 are attached to the movable platen 120 with pins or the like so as to be free to swing. The second links 153 are attached to the toggle support 130 with pins or the like so as to be free to swing. The second links 153 are attached to the crosshead 151 via third links 154. When the crosshead 151 is moved forward or backward with respect to the toggle support 130, the first links 152 and the second links 153 bend and stretch, and the movable platen 120 moves forward or backward with respect to the toggle support 130.

Note that the configuration of the toggle mechanism 150 is by no means limited to the configurations shown in FIG. 1 and FIG. 2. For example, although the number of nodes in each set of links is five in FIG. 1 and FIG. 2, this may be four, and one end part of the third link 154 may be connected to a node between a first link 152 and a second link 153.

A clamping motor 160 is attached to the toggle support 130 to activate the toggle mechanism 150. The clamping motor 160 moves the crosshead 151 forward and backward with respect to the toggle support 130, thereby making the first links 152 and the second links 153 bend and stretch, and allowing the movable platen 120 to move forward and backward with respect to the toggle support 130. The clamping motor 160 is directly connected to the motion conversion mechanism 170, but may be connected to the motion conversion mechanism 170 via a belt, a pulley and the like.

The motion conversion mechanism 170 converts the rotational motion of the clamping motor 160 into linear motion of the crosshead 151.

The motion conversion mechanism 170 includes a screw shaft, and a screw nut that is screwed into the screw shaft. A ball or a roller may be interposed between the screw shaft and the screw nut.

The clamping device 100 performs a mold-closing step, a pressurizing step, a clamping step, a depressurizing step, a mold-opening step, and so forth, under the control of the control device 700.

In the mold-closing step, the clamping motor 160 is driven to move the crosshead 151 forward at a set moving speed, to the position where the mold is completely closed, thereby moving the movable platen 120 forward and making the movable mold 820 touch the fixed mold 810. The position and moving speed of the crosshead 151 are detected by using, for example, a clamping motor encoder 161 or the like. The clamping motor encoder 161 detects the rotation of the clamping motor 160, and sends a signal indicating the detection result, to the control device 700.

Note that, as for the crosshead position sensor for detecting the position of the crosshead 151 and the crosshead moving speed sensor for detecting the moving speed of the crosshead 151, these are by no means limited to the clamping motor encoder 161, and more general ones can be used. Also, as for the movable platen position sensor for detecting the position of the movable platen 120 and the movable platen moving speed sensor for detecting the moving speed of the movable platen 120, these are by no means limited to the clamping motor encoder 161, and more general ones can be used.

In the pressurizing step, the clamping motor 160 is further driven to move the crosshead 151 farther forward from the position where the mold is completely closed, to the clamping position, thereby generating a clamping force.

In the clamping step, the clamping motor 160 is driven to keep the crosshead 151 at the clamping position. In the clamping step, the clamping force generated in the pressurizing step is maintained. In the clamping step, a cavity space 801 (see FIG. 2) is formed between the movable mold 820 and the fixed mold 810, and the injection device 300 fills the cavity space 801 with a liquid molding material. A molded product is obtained as the filled molding material solidifies.

There may be one cavity space 801 or multiple cavity spaces 801. In the latter case, a plurality of molded products can be obtained at a time. An insert material may be placed in one part of the cavity space 801, and another part of the cavity space 801 may be filled with the molding material. By this means, a molded product in which the insert material and the molding material are integrated as one can be made.

In the depressurizing step, the clamping motor 160 is driven to move the crosshead 151 backward from the clamping position to the position where the mold starts opening, thereby moving the movable platen 120 backward and reducing the clamping force. The position where the mold starts opening and the position where the mold is completely closed may be the same position.

In the mold-opening step, the clamping motor 160 is driven to move the crosshead 151 backward, at a set moving speed, from the position where the mold starts opening to the position where the mold is fully open, thereby moving the movable platen 120 backward and separating the movable mold 820 from the fixed mold 810. Subsequently, the ejector device 200 ejects the molded product from the movable mold 820.

The settings in the mold-opening step, the pressurizing step, and the clamping step are set together as a series of settings. For example, the moving speed, the position, and the clamping force of the crosshead 151 in the mold-opening step and the pressurizing step (including the position where the mold starts closing, the position where the moving speed is switched, the position where the mold is completely closed, and the clamping position) are set together as a series of settings. The position where the mold starts closing, the position where the moving speed is switched, the position where the mold is completely closed, and the clamping position are arrayed in this order, from the rear to the front, and represent the starting and ending points of sections where the moving speed is set. The moving speed is set per section. The moving speed may be switched at one position or may be switched at a number of positions. The position to switch the moving speed need not be set. Either one of the clamping position or the clamping force may be set.

The settings in the depressurizing step and the mold-opening step are set similarly. For example, the moving speed and the position of the crosshead 151 in the depressurizing step and the mold-opening step (including the position where the mold starts opening, the position where the moving speed is switched, and the position where the mold is fully open) are set together as a series of settings. The position where the mold starts opening, the position where the moving speed is switched, and the position where the mold is fully open are arrayed in this order, from the front to the rear, and represent the starting and ending points of sections where the moving speed is set. The moving speed is set per section. The moving speed may be switched at one position or may be switched at a number of positions. The position to switch the moving speed need not be set. The position where the mold starts opening and the position where the mold is completely closed may be the same position. Also, the position where the mold is fully open and the position where the mold begins to close may be the same position.

Note that, instead of the moving speed and the position of the crosshead 151, the moving speed and the position of the movable platen 120 may be set. Also, the clamping force may be set instead of the position of the crosshead (for example, the clamping position) or the position of the movable platen.

Now, the toggle mechanism 150 amplifies the driving force of the clamping motor 160 and sends this to the movable platen 120. The rate of this magnification is also referred to as "toggle magnification." The toggle magnification changes according to an angle θ that is formed between the first link 152 and the second link 153 (hereinafter also referred to as "link angle θ"). Link angle θ can be determined from the position of the crosshead 151. The toggle magnification becomes the largest when link angle θ is 180 degrees.

When the thickness of the mold device 800 changes due to replacement of the mold device 800 or a change in the temperature of the mold device 800, the thickness of the mold is adjusted so that a predetermined clamping force can be obtained when clamping the mold. In adjusting the thickness of the mold, for example, the distance L between the fixed platen 110 and the toggle support 130 is adjusted such that link angle θ in the toggle mechanism 150 becomes a predetermined angle upon mold touch, which is when the movable mold 820 touches the fixed mold 810.

The clamping device 100 includes a mold thickness adjusting mechanism 180. The mold thickness adjusting mechanism 180 adjusts the mold's thickness by adjusting the distance L between the fixed platen 110 and the toggle support 130. Note that the time for adjusting the mold's thickness is provided, for example, between the end of a molding cycle and the start of the next molding cycle. The mold thickness adjusting mechanism 180 includes, for example: a screw shaft 181 that is formed in the rear end part of the tie bar 140; a screw nut 182 that is held by the toggle support 130 so as to be free to rotate and unable to move forward and backward; and a mold thickness adjusting motor 183 that rotates the screw nut 182 that is screwed into the screw shaft 181.

A screw shaft 181 and a screw nut 182 are provided for each tie bar 140. The rotational driving force of the mold thickness adjusting motor 183 may be transmitted to a plurality of screw nuts 182 via a rotational drive force transmission part 185. These screw nuts 182 can rotate synchronously. Note that it is also possible to rotate multiple screw nuts 182 individually by changing the transmission path of the rotational drive force transmission part 185.

The rotational drive force transmission part 185 may be composed of gears and the like, for example. In this case, passive gears are formed on the outer periphery of each screw nut 182, a drive gear is attached to the output shaft of the mold thickness adjusting motor 183, and an intermediate gear that meshes with a plurality of passive gears and drive gears is rotatably held in the center part of the toggle support 130. Note that the rotational drive force transmission part 185 may be composed of belts, pulleys, or the like, instead of gears.

The operation of the mold thickness adjusting mechanism 180 is controlled by the control device 700. The control device 700 drives the mold thickness adjusting motor 183 to rotate the screw nut 182. As a result of this, the position of the toggle support 130 with respect to the tie bar 140 is adjusted, and the distance L between the fixed platen 110 and the toggle support 130 is adjusted. Note that multiple mold thickness adjusting mechanisms may be used in combination.

The distance L is detected using the mold thickness adjusting motor encoder 184. The mold thickness adjusting motor encoder 184 detects the amount of rotation, the direction of rotation, and so forth of the mold thickness adjusting motor 183, and sends signals indicating these detection results to the control device 700. The detection results of the mold thickness adjusting motor encoder 184 are used to monitor and control the position of the toggle support 130 and the distance L. Note that the toggle support position sensor for detecting the position of the toggle support 130 and the distance sensor for detecting the distance L are by no means limited to the mold thickness adjusting motor encoder 184, and more general ones can be used.

The clamping device 100 may include a metallic mold temperature adjustor for adjusting the temperature of the mold device 800. The mold device 800 has, in its inside, a channel for a temperature control medium. The metallic mold temperature adjustor adjusts the temperature of the mold device 800 by adjusting the temperature of the temperature control medium supplied to the channel in the mold device 800.

Note that, although the clamping device 100 of this embodiment is a horizontal type in which the mold opens and closes horizontally, the clamping device 100 may also be a vertical type in which the mold opens and closes vertically.

Also, although the clamping motor 160 serves as a drive part in the clamping device 100 of this embodiment, an oil-pressure cylinder may be provided instead of the clamping motor 160. Also, the clamping device 100 may include a linear motor for opening and closing the mold and an electromagnet for clamping the mold.

(Ejector Device)

In the description of the ejector device 200, as in the description of the clamping device 100, the direction in which the movable platen 120 moves when closing the mold (for example, the positive X-axis direction) is defined as the front, and the direction in which the movable platen 120 moves when opening the mold (for example, the negative X-axis direction) is defined as the rear.

The ejector device 200 is attached to the movable platen 120, and moves forward and backward with the movable platen 120. The ejector device 200 includes: an ejector rod

210 for ejecting the molded product from the mold device 800; and a drive mechanism 220 for moving the ejector rod 210 in the direction in which the movable platen 120 moves (the X-axis direction).

The ejector rod 210 is disposed in a through-hole of the movable platen 120 so as to be free to move forward and backward. The front-end part of the ejector rod 210 contacts the ejector plate 826 of the movable mold 820. The front-end part of the ejector rod 210 may or may not be connected with the ejector plate 826.

The drive mechanism 220 includes, for example: an ejector motor; and a motion conversion mechanism that converts the rotational motion of the ejector motor into linear motion of the ejector rod 210. The motion conversion mechanism includes a screw shaft and a screw nut that is screwed into the screw shaft. A ball or a roller may be interposed between the screw shaft and the screw nut.

The ejector device 200 performs an ejection step under the control of the control device 700. In the ejection step, the ejector rod 210 is moved from the standby position to the ejection position at a set moving speed, thereby moving the ejector plate 826 forward and ejecting the molded product. Subsequently, the ejector motor is driven to move the ejector rod 210 backward at a set moving speed, and the ejector plate 826 is moved backward to the original standby position.

The position and moving speed of the ejector rod 210 are detected by using, for example, an ejector motor encoder. The ejector motor encoder detects the rotation of the ejector motor and sends a signal indicating the detection result to the control device 700. Note that the ejector rod position sensor for detecting the position of the ejector rod 210 and the ejector rod moving speed sensor for detecting the moving speed of the ejector rod 210 are by no means limited to an ejector motor encoder, and more general ones can be used.

(Injection Device)

In the following description of the injection device 300, unlike the description of the clamping device 100 and the description of the ejector device 200, the direction in which the screw 330 moves during filling (for example, the negative X-axis direction) will be defined as the front, and the direction in which the screw 330 moves during measurement (for example, the positive X-axis direction) will be defined as the rear.

The injection device 300 is installed on a sliding base 301. The sliding base 301 is arranged so as to be free to move forward and backward with respect to the injection device frame 920. The injection device 300 is arranged to be free to move forward and backward with respect to the mold device 800. The injection device 300 touches the mold device 800, and fills the cavity space 801 in the mold device 800 with the molding material. The injection device 300 includes, for example: a cylinder 310 that heats the molding material; a nozzle 320 provided at the front-end part of the cylinder 310; a screw 330 arranged inside the cylinder 310 so as to be free to move forward and backward and free to rotate; a measurement motor 340 that rotates the screw 330; an injection motor 350 that moves the screw 330 forward and backward; and a load sensor 360 that detects the load transmitted between the injection motor 350 and the screw 330.

The cylinder 310 heats the molding material supplied from a supply port 311. The molding material includes, for example, a resin or the like. The molding material is, for example, formed in pellets, and supplied to the supply port 311 in a solid state. The supply port 311 is formed in the rear part of the cylinder 310. A cooler 312, such as a water-cooled cylinder, is provided in the outer periphery of the rear part of the cylinder 310. A heater 313, such as a band heater and a temperature sensor 314, are provided in the outer periphery of the cylinder 310, on the front side of the cooler 312.

The cylinder 310 is divided into a plurality of zones in the axial direction (for example, the X-axis direction) of the cylinder 310. A first heater 313 and a first temperature sensor 314 are provided in each of these multiple zones. A set temperature is provided in each zone, and the control device 700 controls the first heater 313 such that the temperature detected by the first temperature sensor 314 matches the set temperature.

The nozzle 320 is provided at the front-end part of the cylinder 310 and pressed against the mold device 800. A second heater 323 and a second temperature sensor 324 are provided in the outer periphery of the nozzle 320. The control device 700 controls the second heater 323 such that the detected temperature of the nozzle 320 matches the set temperature.

The screw 330 is provided in the cylinder 310 such that the screw 330 is free to rotate and free to move forward and backward. When the screw 330 rotates, the molding material is sent forward following the spiral threads of the screw 330. The molding material, while being sent forward, is melted gradually by the heat from the cylinder 310. As the liquid molding material is sent in front of the screw 330 and accumulated in front of the cylinder 310, the screw 330 moves backward. Subsequently, when the screw 330 moves forward, the liquid molding material accumulated in front of the screw 330 is injected from the nozzle 320 and fills the inside of the mold device 800.

A backflow preventing ring 331 is attached to the front part of the screw 330 such that the backflow preventing ring 331 is free to move forward and backward. The backflow preventing ring 331 serves as a backflow preventing valve for preventing the backflow of the molding material when the screw 330 is pushed forward and the molding material is sent from the front to the rear.

When the screw 330 moves forward, the backflow preventing ring 331 is pushed backward by the pressure of the molding material that is located in front of the screw 330, and moves backward relative to the screw 330, to a blocking position (see FIG. 2) where the backflow preventing ring 331 blocks the channel of the molding material. By this means, the molding material accumulated in front of the screw 330 is prevented from flowing backward.

Meanwhile, when the screw 330 rotates, the backflow preventing ring 331 is pushed forward by the pressure of the molding material that is sent forward along the spiral threads of the screw 330, and moves forward relative to the screw 330 up to the open position, which is where the channel for the molding material opens up (see FIG. 1). By this means, the molding material is sent to the front side of the screw 330.

The backflow preventing ring 331 may be either a co-rotating type that rotates with the screw 330 or a non-co-rotating type that does not rotate with the screw 330.

Note that the injection device 300 may include a drive source that makes the backflow preventing ring 331 move forward and backward between the open position and the closed position, with respect to the screw 330.

The measurement motor 340 makes the screw 330 rotate. The drive source for rotating the screw 330 is by no means limited to the measurement motor 340, and may be, for example, an oil-pressure pump or the like.

The injection motor 350 makes the screw 330 move forward and backward. Between the injection motor 350 and the screw 330, a motion conversion mechanism for converting the rotational motion of the injection motor 350 into linear motion of the screw 330, and the like is provided. The motion conversion mechanism includes, for example, a screw shaft, and a screw nut that is screwed into the screw shaft. A ball, a roller, or the like may be provided between the screw shaft and the screw nut. The drive source for making the screw 330 move forward and backward is by no means limited to the injection motor 350, and, for example, an oil-pressure cylinder or the like may be used.

The load sensor 360 detects the load that is transmitted between the injection motor 350 and the screw 330. The detected load is converted into pressure in the control device 700. The load sensor 360 is provided on the transmission path of the load between the injection motor 350 and the screw 330, and detects the load that acts on the load sensor 360.

The load sensor 360 sends a signal indicating the detection result to the control device 700. The load detected by the load sensor 360 is converted into pressure that acts between the screw 330 and the molding material, and used to control or monitor the pressure the screw 330 receives from the molding material, the back pressure upon the screw 330, the pressure acting on the molding material from the screw 330, and so forth.

Note that the pressure sensor for detecting the pressure of the molding material is by no means limited to the load sensor 360, and more general ones can be used as well. For example, a nozzle pressure sensor or an inner-mold pressure sensor may be used. The nozzle pressure sensor may be installed in the nozzle 320. e inner-mold pressure sensor may be installed in the mold device 800.

The injection device 300 performs a measurement step, a filling step, a pressure-holding step, and so forth, under the control of the control device 700. The filling step and the pressure-holding step may be also collectively referred to as an "injection step."

In the measurement step, the measurement motor 340 is driven to rotate the screw 330 at a number of rotations per unit time according to the settings, and the molding material is sent forward following the spiral threads of the screw 330. Accompanying this, the molding material melts gradually. As the liquid molding material is sent in front of the screw 330 and accumulated in front of the cylinder 310, the screw 330 moves backward. The number of rotations of the screw 330 per unit time is detected by using, for example, a measurement motor encoder 341. The measurement motor encoder 341 detects the rotation of the measurement motor 340, and sends a signal indicating the detection result to the control device 700. Note that the screw rotation speed sensor for detecting the number of rotations of the screw 330 per unit time is by no means limited to the measurement motor encoder 341, and more general ones can be used as well.

In the measurement step, the injection motor 350 may be driven to apply a back pressure determined by the settings to the screw 330, so as to prevent the screw 330 from moving backward too suddenly. The back pressure upon the screw 330 is detected by using, for example, the load sensor 360. When the screw 330 moves back to the position where the measurement ends and a predetermined amount of molding material is accumulated in front of the screw 330, the measurement step is completed.

The position and number of rotations of the screw 330 per unit time are set together as a series of settings. For example, the position where the measurement is started, the position where the number of rotations per unit time is switched, and the position where the measurement is completed are set. These positions are arrayed in this order from the front to the rear, and represent the starting points and the ending points of sections where the number of rotations per unit time is set. The number of rotations per unit time is set per section. The number of rotations per unit time may be switched at one position or may be switched at a number of positions. The position to switch the number of rotations per unit need not be set. Also, the back pressure is set per section.

In the filling step, the injection motor 350 is driven to move the screw 330 forward at a set moving speed. The cavity space 801 in the mold device 800 is filled with the liquid molding material accumulated in front of the screw 330. The position and moving speed of the screw 330 are detected by using, for example, an injection motor encoder 351. The injection motor encoder 351 detects the rotation of the injection motor 350 and sends a signal indicating the detection result to the control device 700. When the position of the screw 330 reaches a set position, the filling step switches to the pressure-holding step (this switching is commonly referred to as "V/P switchover"). The position where V/P switchover takes place is also referred to as the "V/P switchover position." The set moving speed of the screw 330 may be changed depending on the position of the screw 330, the time, and so forth.

The position and the moving speed of the screw 330 in the filling step are set together as a series of settings. For example, the position where the filling is started (also referred to as "the injection-starting position"), the position to switch the moving speed, and the V/P switchover position are set. These positions are arranged in this order, from the rear to the front, and represent the starting points and ending points of sections where the moving speed is set. The moving speed is set per section. The moving speed may be switched at one position or may be switched at a number of positions. The position to switch the moving speed need not be set.

In every section in which the moving speed of the screw 330 is set, the upper limit value of pressure for the screw 330 is set. The pressure of the screw 330 is detected by the load sensor 360. When the pressure of the screw 330 is less than or equal to a set pressure, the screw 330 is moved forward at the set moving speed. On the other hand, when the pressure of the screw 330 is greater than the set pressure, the screw 330 is moved forward at a moving speed slower than the set moving speed, such that the pressure of the screw 330 becomes less than or equal to the set pressure, in order to protect the mold.

Note that, when the position of the screw 330 arrives at the V/P switchover position during the filling step, the screw 330 may be temporarily stopped at the V/P switchover position, and V/P switchover may be carried out later. Shortly before the V/P switchover, the screw 330 may be moved forward or backward at a low speed, instead of stopping. Also, as for the screw position sensor for detecting the position of the screw 330 and the screw moving speed sensor for detecting the moving speed of the screw 330, these are by no means limited to the injection motor encoder 351, and more general ones can be used.

In the pressure-holding step, the injection motor 350 is driven to push the screw 330 forward, the pressure on the molding material in the front-end part of the screw 330 (hereinafter also referred to as the "holding pressure") is kept at a set pressure, and the molding material that remains in the cylinder 310 is pushed toward the mold device 800. By this means, the shortage of the molding material due to cooling-induced contraction inside the mold device 800 can be replenished. The holding pressure is detected by using, for example, the load sensor 360. The set value of the holding pressure may be changed in accordance with the time elapsed since the start of the pressure-holding step, and so forth. The holding pressure and the time to keep the holding pressure in the pressure-holding step may be set multiple in number, and may be set together as a series of settings.

In the pressure-holding step, the molding material in the cavity space 801 in the mold device 800 gradually cools down, and, when the pressure-holding step is completed, the inlet of the cavity space 801 is sealed with the solidified molding material. This state is referred to as "gate seal," and the backflow of the molding material from the cavity space 801 is prevented therewith. After the pressure-holding step, the cooling step is started. In the cooling step, the molding material in the cavity space 801 is solidified. The measurement step may be performed during the cooling step, so as to reduce the time cycle of molding.

Note that, although the injection device 300 of this embodiment employs an in-line screw method, a pre-plunger method or the like may be employed as well. The pre-plunger-type injection device supplies the molding material melted in a plasticized cylinder, to an injection cylinder, and injects the molding material from the injection cylinder into the mold device. A screw is provided in the plasticized cylinder so as to be free to rotate, or free to rotate and move forward and backward. Meanwhile, a plunger is provided inside the injection cylinder, free to move forward and backward.

Also, although the injection device 300 of this embodiment is a horizontal type in which the axial direction of the cylinder 310 is horizontal, the injection device 300 may be a vertical type in which the axial direction of the cylinder 310 is vertical. The clamping device to be combined with a vertical injection device 300 may be vertical or horizontal. Similarly, the clamping device to be combined with a horizontal injection device 300 may be horizontal or vertical.

(Move Device)

In the description of the move device 400, as in the above description of the injection device 300, the direction in which the screw 330 moves during filling (for example, the negative X-axis direction) is the front, and the direction in which the screw 330 moves during measurement (for example, the positive X-axis direction) is the rear.

The move device 400 allows the injection device 300 to move forward and backward with respect to the mold device 800. Also, the move device 400 presses the nozzle 320 against the mold device 800 to generate a nozzle touch pressure. The move device 400 includes: a liquid-pressure pump 410; a motor 420 to serve as a drive source; a liquid-pressure cylinder 430 to serve as a liquid-pressure actuator; and so forth.

The liquid-pressure pump 410 has a first port 411 and a second port 412. The liquid-pressure pump 410 is a pump that can rotate in both directions, and, by switching the direction of rotation of the motor 420, the liquid-pressure pump 410 sucks in the hydraulic fluid (for example, oil) from one of the first port 411 and the second port 412 and discharges it from the other one, thereby generating a hydraulic pressure. The liquid-pressure pump 410 can also suck in the hydraulic fluid from a tank and discharge it from one of the first port 411 or the second port 412.

The motor 420 makes the liquid-pressure pump 410 operate. The motor 420 drives the liquid-pressure pump 410 in the direction of rotation, and with rotational torque, in accordance with control signals from the control device 700. The motor 420 may be an electric motor or an electric servo motor.

The liquid-pressure cylinder 430 includes a cylinder body 431, a piston 432, and a piston rod 433. The cylinder body 431 is fixed to the injection device 300. The piston 432 divides the inside of the cylinder body 431 into a front chamber 435 that serves as a first chamber, and a rear chamber 436 that serves as a second chamber. The piston rod 433 is fixed to the fixed platen 110.

The front chamber 435 of the liquid-pressure cylinder 430 is connected with the first port 411 of the liquid-pressure pump 410 via a first channel 401. The hydraulic fluid discharged from the first port 411 is supplied to the front chamber 435 via the first channel 401, pushing the injection device 300 forward. As the injection device 300 moves forward, the nozzle 320 is pressed against the fixed mold 810. The front chamber 435 functions as a pressure chamber that generates a nozzle touch pressure of the nozzle 320 by using the pressure of the hydraulic fluid supplied from the liquid-pressure pump 410.

Meanwhile, the rear chamber 436 of the liquid-pressure cylinder 430 is connected with the second port 412 of the liquid-pressure pump 410 via a second channel 402. The hydraulic fluid discharged from the second port 412 is supplied to the rear chamber 436 of the liquid-pressure cylinder 430 via the second channel 402, pushing the injection device 300 backward. As the injection device 300 moves backward, the nozzle 320 is separated from the fixed mold 810.

Note that, although the move device 400 according to the present embodiment includes the liquid-pressure cylinder 430, the present invention is by no means limited to this. For example, it is possible to use an electric motor and a motion conversion mechanism that converts the rotational motion of the electric motor into linear motion of the injection device 300, instead of using the liquid-pressure cylinder 430.

(Control Device)

The control device 700 is composed of a computer, and, as shown in FIG. 1 and FIG. 2, includes: a CPU (Central Processing Unit) 701; a memory medium 702 such as a memory; an input interface 703; and an output interface 704. The control device 700 causes the CPU 701 to execute programs stored in the memory medium 702, and performs various controls. Also, the control device 700 receives signals from the outside via the input interface 703, and sends signals to the outside via the output interface 704.

The control device 700 repeats the measurement step, the mold-closing step, the pressurizing step, the clamping step, the filling step, the pressure-holding step, the cooling step, the depressurizing step, the mold-opening step, the ejection step, and so forth, thereby repeatedly manufacturing the molded product. The series of operations for having a molded product is also referred to as a "shot" or a "molding cycle." This includes, for example, the operation from the start of the measurement step, up to the start of the next measurement step. Also, the time required for one shot is also referred to as a "molding cycle time" or a "cycle time."

One molding cycle is composed of, for example, a measurement step, a mold-closing step, a pressurizing step, a clamping step, a filling step, a pressure-holding step, a cooling step, a depressurizing step, a mold-opening step, and an ejection step, performed in this order. This order is the order of starting each step. The filling step, the pressure-holding step, and the cooling step are performed during the clamping step. The start of the clamping step may match the start of the filling step. Also, the end of the depressurizing step may match the start of the mold-opening step.

Note that multiple steps may be performed simultaneously in order to shorten the molding cycle time. For example, the measurement step may be performed during the cooling step in the previous molding cycle, or during the clamping step. In this case, the mold-closing step may be performed at the beginning of the molding cycle. Also, the filling step may be started during the mold-closing step. The ejection step may be started during the mold-opening step. When an on-off valve for opening and closing the channel of the nozzle 320 of the injection device 300 is provided, the mold-opening step may be started during the measurement step. This is because, even if the mold-opening step is started during the measurement step, the molding material does not leak from the nozzle 320 as long as the channel of the nozzle 320 is closed by the on-off valve.

Note that one molding cycle may include steps other than the measurement step, the mold-closing step, the pressurizing step, the clamping step, the filling step, the pressure-holding step, the cooling step, the depressurizing step, the mold-opening step, and the ejection step.

For example, after completing the pressure-holding step and before starting the measurement step, a pre-measurement suck-back step may be performed, in which the screw 330 is moved backward to a pre-configured measurement starting position. In this case, the pressure of the molding material accumulated in front of the screw 330 can be reduced before the measurement step is started, so that the screw 330 can be prevented from moving backward too suddenly at the start of the measurement step.

Also, after completing the measurement step and before starting the filling step, a post-measurement suck-back step may be performed, in which the screw 330 is moved backward to a pre-configured filling starting position (also referred to as the "injection starting position"). In this case, the pressure of the molding material accumulated in front of the screw 330 can be reduced before the filling step is started, so that the molding material is prevented from leaking from the nozzle 320 before the filling step is started.

The control device 700 is connected to an operating device 750 that receives the user's input operations, and a display device 760 that displays a screen. The operating device 750 and the display device 760 may be set with a touch panel 770, for example, and may be integrated with the touch panel 770. The touch panel 770, when serving as a display device 760, displays a screen under the control of the control device 700. The screen of the touch panel 770 may display information such as, for example, the settings of the injection molding machine 10, the current state of the injection molding machine 10, and so forth. Also, on the screen of the touch panel 770, for example, operating parts such as buttons for receiving the user's input operations, input fields, and the like may be displayed. The touch panel 770, when serving as an operating device 750, detects the user's input operations on the screen, and outputs signals corresponding to the input operations to the control device 700. By this means, for example, the user can check the information displayed on the screen, and operate the operating parts displayed on the screen to, for example, set up the injection molding machine 10 (including inputting values for the settings). Also, since the user operates the operating parts provided on the screen, the injection molding machine 10 is able to operate in accordance with the operating parts. Note that the operation of the injection molding machine 10 may be, for example, the operation (including a stop) of the clamping device 100, the ejector device 200, the injection device 300, the move device 400, and so forth. Also, the operation of the injection molding machine 10 may be, for example, switching of the screen displayed on the touch panel 770 serving as the display device 760.

Note that, although the operating device 750 and the display device 760 of the present embodiment are described as integrated in a touch panel 770, they may be provided separately as well. Also, multiple operating devices 750 may be provided. The operating device 750 and the display device 760 are positioned on the operating side (the negative Y-axis direction) of the clamping device 100 (to be more specific, the fixed platen 110).

(Detail of Control Device)

Figure 3:
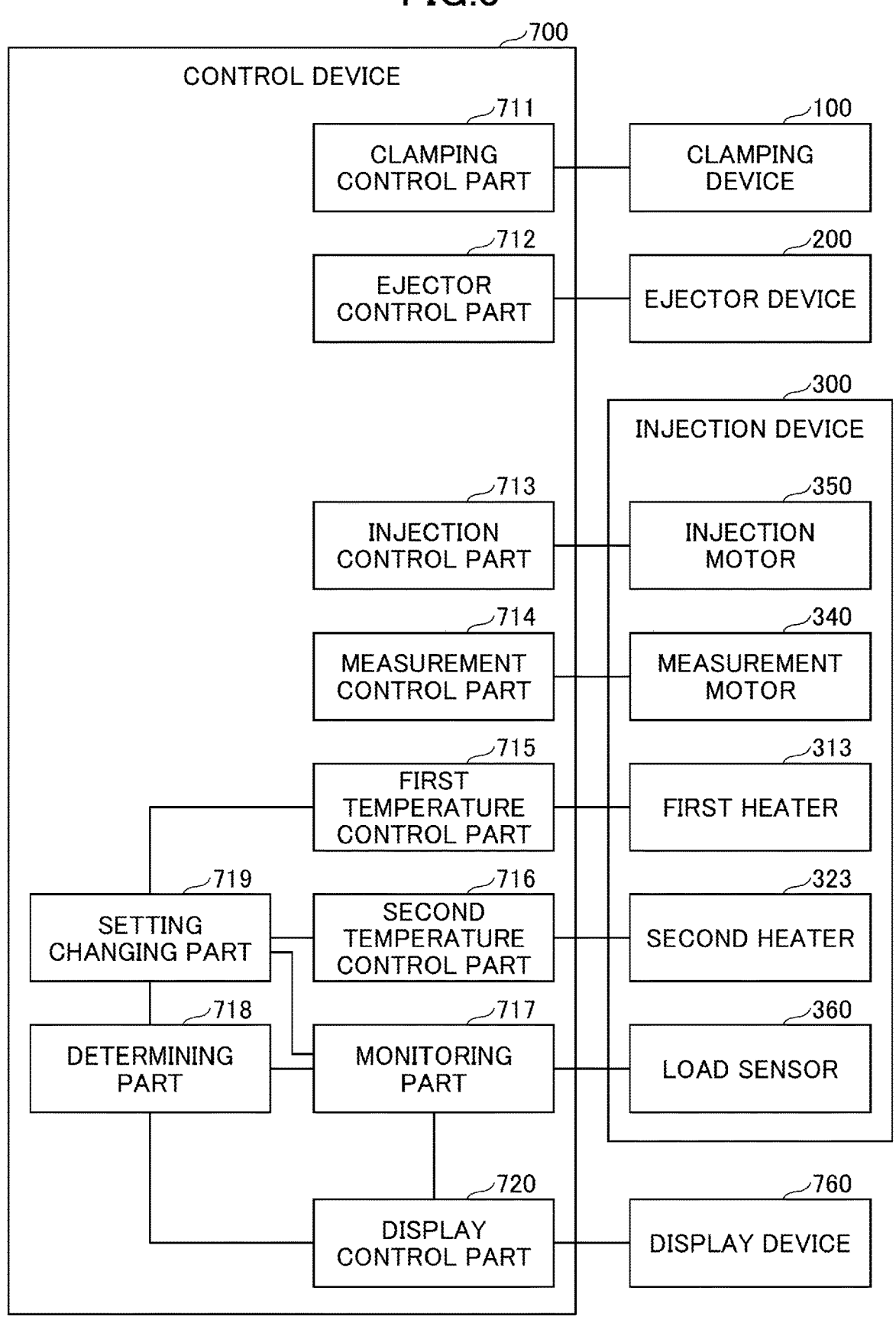
FIG. 3 is a diagram showing examples of components of a control device in functional blocks.

Next, examples of components of the control device 700 will be described with reference to FIG. 3. Note that the functional blocks shown in FIG. 3 are simply conceptual, and do not necessarily have to be physically configured as illustrated. All or part of the functional blocks can be functionally or physically distributed or integrated in arbitrary units. All or part of the processing functions performed by each functional block are implemented by programs executed by the CPU 701. Alternatively, each functional block may be implemented as hardware by wired logic.

Figure 4:
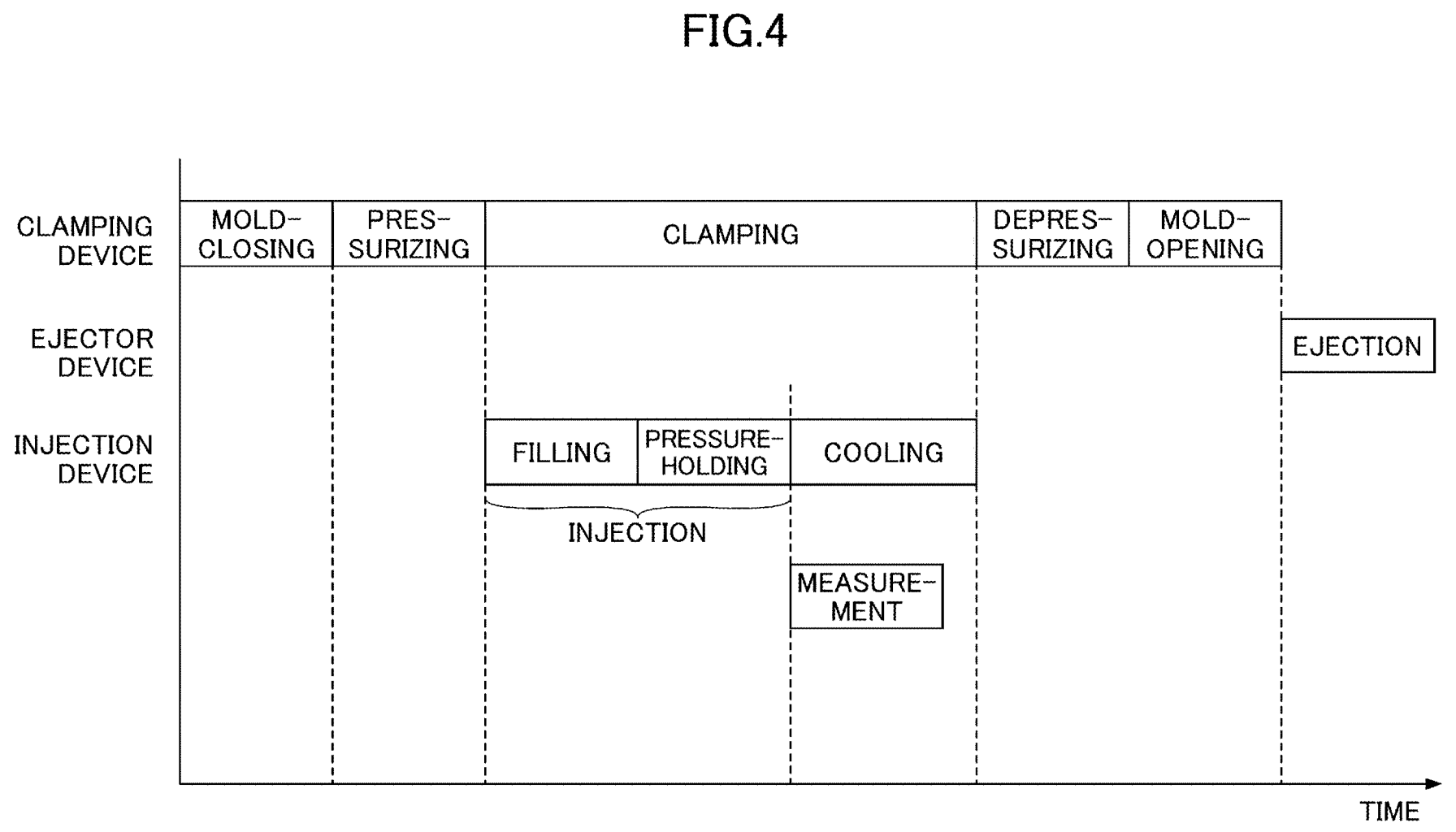

As shown in FIG. 3, the control device 700 includes, for example, a clamping control part 711, an ejector control part 712, an injection control part 713, and a measurement control part 714. The clamping control part 711 controls the clamping device 100 to perform the mold-closing step, the pressurizing step, the clamping step, the depressurizing step and the mold-opening step shown in FIG. 4. The ejector control part 712 controls the ejector device 200 to perform the ejection step. The injection control part 713 controls the injection drive source of the injection device 300 to perform the injection step. The injection drive source is, for example, an injection motor 350, but an oil-pressure cylinder or the like may be used as well. The injection step includes the filling step and the pressure-holding step. The injection step is performed during the clamping step. The measurement control part 714 controls the measurement drive source of the injection device 300 to perform the measurement step. The measurement drive source is, for example, a measurement motor 340, but an oil-pressure pump or the like may be used as well. The measurement step is performed during the cooling step.

In the filling step, the injection drive source is controlled so that the actual value of the moving speed of the injection member provided inside the cylinder 310 matches the set value. In the filling step, the injection member is moved forward so as to fill the inside of the mold device 800 with the liquid molding material accumulated in front of the injection member. The injection member is, for example, a screw 330 (see FIG. 1 and FIG. 2), but a plunger may be used as well.

The moving speed of the injection member is detected by using a speed sensor. The speed sensor is, for example, an injection motor encoder 351. In the filling step, as the injection member moves forward, the pressure to act on the molding material from the injection member increases (hereinafter this pressure will be referred to as the "filling pressure"). The filling step may include pausing the injection member, or retracting the injection member, shortly before the pressure-holding step.

In the pressure-holding step, the injection drive source is controlled so that the actual value of the filling pressure matches the set value. In the pressure-holding step, the shortage of the molding material due to cooling-induced contraction in the mold device 800 is replenished by pushing the injection member forward. The filling pressure is detected by using a pressure sensor such as the load sensor 360. A nozzle pressure sensor or an inner-mold pressure sensor may be used as the pressure sensor.

As shown in FIG. 3, the control device 700 includes a first temperature control part 715 and a second temperature control part 716. The first temperature control part 715 controls the first heater 313, and controls the temperature of the cylinder 310 (see FIG. 1 and FIG. 2). The cylinder 310 heats the molding material. The first temperature control part 715 controls the first heater 313 so that the temperature detected by the first temperature sensor 314 matches the set temperature.

The second temperature control part 716 controls the second heater 323, and controls the temperature of the nozzle 320 (see FIG. 1 and FIG. 2). The nozzle 320 is provided at the tip of the cylinder 310, and injects the molding material heated by the cylinder 310 into the mold device 800. The second temperature control part 716 controls the second heater 323 so that the temperature detected by the second temperature sensor 324 matches the set temperature.

Figure 5:
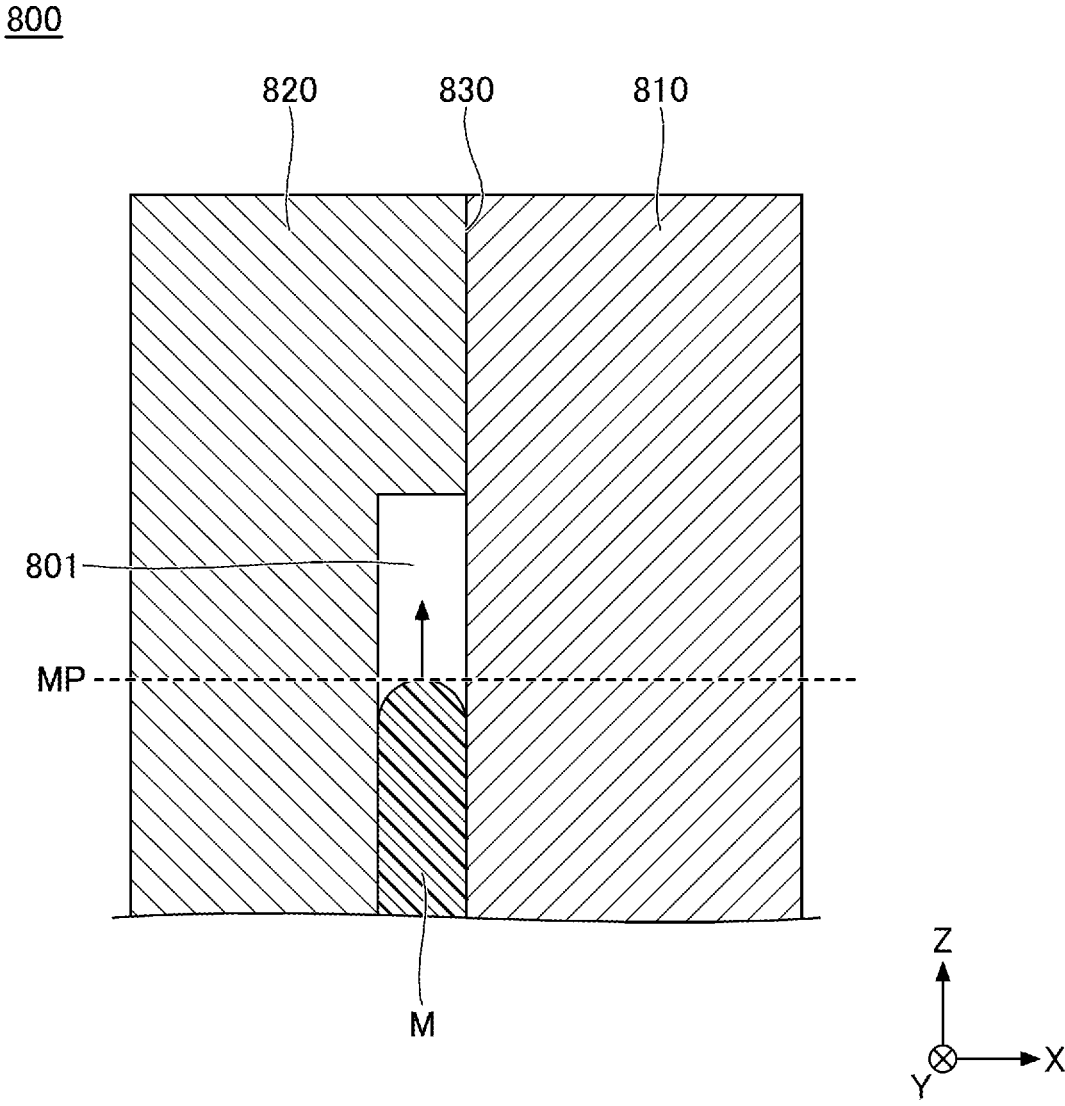
FIG. 5 is a cross-sectional view showing an example of a molding material that flows into a mold device.

Next, an example of the molding material M that flows into the mold device 800 will be described with reference to FIG. 5. The molding material M is, for example, resin. The molding material M flows into the cavity space 801 inside the mold device 800. The cavity space 801 is formed at a parting surface 830 of the fixed mold 810 and the movable mold 820. The parting surface 830 is commonly referred to as a "parting line."

When the filling step switches to the pressure-holding step (known as "V/P switchover"), if the foremost position MP of the flow of the molding material M (see FIG. 5) is in the desired range, gas burn is less likely to occur. Gas burn refers to a phenomenon in which the molding material M flows into the cavity space 801, and the gas in the cavity space 801 is compressed, produces heat, and carbonizes the molding material M. When gas burn occurs, the gas in the cavity space 801 cannot go out of the mold device 800 with ease, and, since the gas thus tends to remain in the cavity space 801, a defect referred to as "short shots" might occur as well. A "short shot" refers to a phenomenon in which the molding material M cools down and solidifies before filling the entire cavity space 801.

The foremost position MP of the flow of the molding material M upon V/P switchover is mainly determined by the V/P switchover position of the injection member, but might also vary depending on other factors as well. One such factor is the temperature of the molding material M injected from the nozzle 320. That temperature is mainly determined by the temperature of the nozzle 320. Note that, when the cycle time is short, not only the temperature of the nozzle 320, but also the temperature of the cylinder 310 becomes important. In particular, among the multiple zones constituting the cylinder 310, the temperature of the zone located closest to nozzle 320 is important. Hereinafter, the temperature of at least one of the nozzle 320 and the cylinder 310 will be referred to as "target temperature."

When the target temperature is too low, what is known as "nozzle clogging" might occur. Nozzle clogging refers to a phenomenon in which the molding material M is not injected from the nozzle 320 even when the filling step is started and the injection member is moved forward. When the injection member is moved further forward and the filling pressure rises sharply, the molding material M is forced out of the nozzle 320 in a burst as if a dam broke. As a result of this, the foremost position MP of the flow of the molding material M tends to vary upon V/P switchover.

Figure 6:
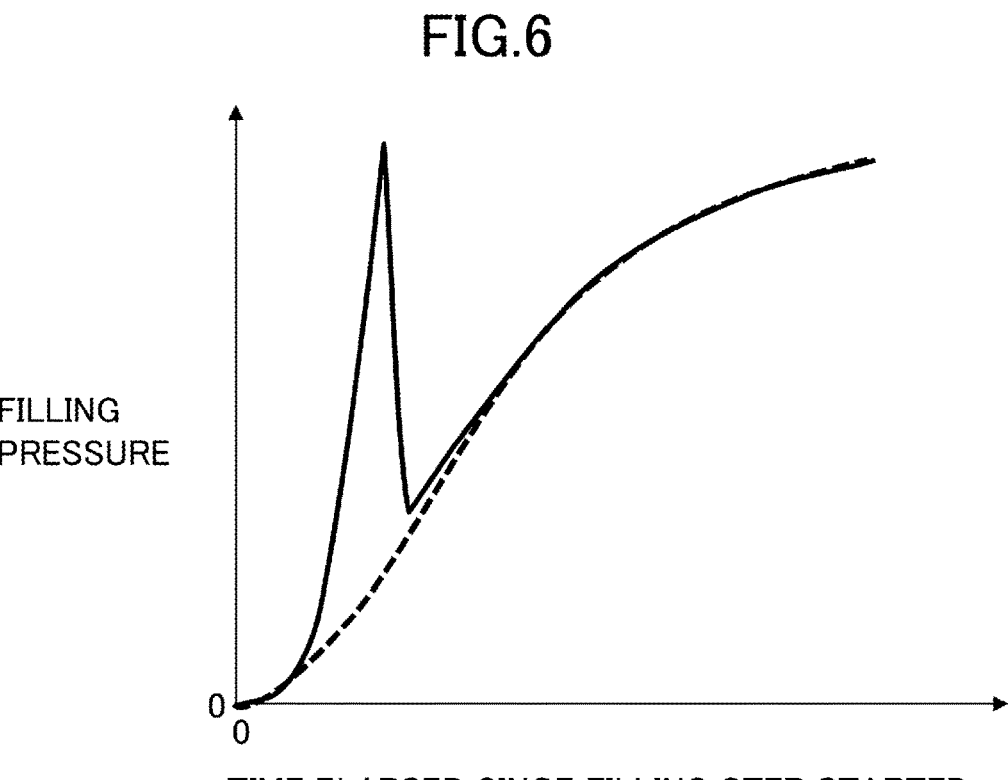
FIG. 6 is a diagram showing a first example of variation of actual values of filling pressure.

When the molding material M is pushed out of the nozzle 320 in a burst as if a dam broke, the filling pressure drops sharply. Therefore, if the temperature of the nozzle 320 or the like is too low and causes nozzle clogging, the filling pressure peaks during the filling step, especially at an early stage in the filling step (see the solid line in FIG. 6). After a dam breaks, it cannot be rebuilt, at least while the injection member is still moving forward. Therefore, the filling pressure peaks only once. Note that, in FIG. 6, the solid line is the waveform of the filling pressure when the target temperature is too low. The dashed line is the waveform of the filling pressure when the target temperature is adequate.

On the other hand, if the target temperature is too high, what is known as drooling might occur. Drooling is a phenomenon in which the molding material leaks from the nozzle 320 into the mold device 800 before the filling step starts. The leaked molding material cools down and solidifies inside the mold device 800 before the filling step starts. As a result of this, obstacles that block the flow of the molding material are created inside the mold device 800.

Figure 7:
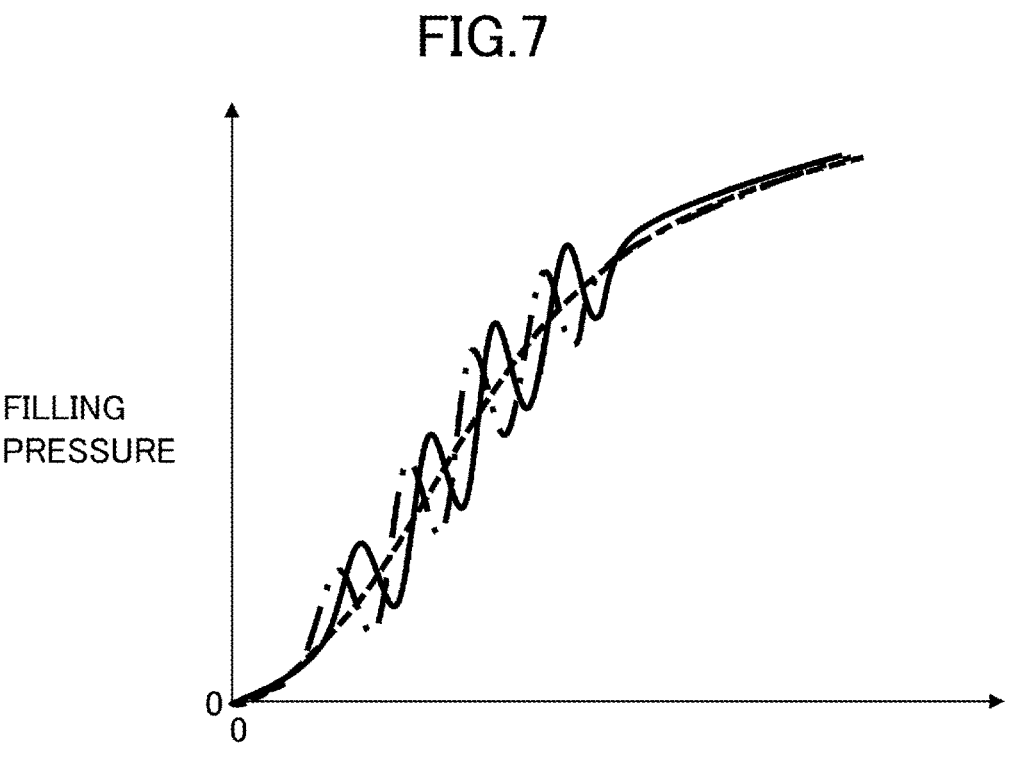
FIG. 7 is a diagram showing a second example of variation of actual values of filling pressure.

When drooling occurs, obstacles that block the flow of the molding material are created inside the mold device 800, and this results in pulsation of the filling pressure (see the solid line and the dashed line in FIG. 7). The pulsation of the filling pressure has recurring small peaks and small valleys. The filling pressure pulsates, instead of peaking, because, unlike a dam, obstacles continue to exist even while the injection member is still moving forward. Note that, in FIG. 7, the solid line and the dashed line are the waveforms of the filling pressure when the target temperature is too high. The dashed line is the waveform of the filling pressure when the target temperature is adequate.

When drooling occurs, obstacles are created inside the mold device 800 and block the flow of the molding material, and therefore the filling pressure furthermore varies between shots (see the solid line and the dashed line in FIG. 7). The reason that the filling pressure varies between shots due to drooling is that neither the amount of the molding material that leaks from the nozzle 320 nor the location where the leaked molding material cools down and solidifies is under control.

Whether nozzle clogging is occurring or drooling is occurring is difficult to determine by inspecting the quality of molded products. Conventionally, the target temperature is set by a skilled worker based on his/her own experience, and it is difficult for an inexperienced worker to set the target temperature.

As shown in FIG. 3, the control device 700 includes a monitoring part 717. The monitoring part 717 monitors changes in the filling pressure during the filling step. For example, the monitoring part 717 monitors changes in the filling pressure in the first half of the filling step (half of the filling time). The monitoring part 717 uses a pressure sensor such as the load sensor 360 to acquire the actual values of the filling pressure. From the changes in the actual value of the filling pressure during the filling step, it is possible to determine whether nozzle clogging is occurring or drooling is occurring. Therefore, monitoring the changes in the actual value of the filling pressure during the filling step can help set the target temperature. As a result, the occurrence of gas burn can be reduced. It is furthermore not only possible to reduce the occurrence of gas burn, but also reduce the occurrence of short shots.

The control device 700 may include a determining part 718, as shown in FIG. 3. The determining part 718 determines the adequacy of the target temperature, based on changes in the actual value of the filling pressure as monitored by the monitoring part 717. For example, the determining part 718 determines the adequacy of the target temperature based on at least one of: whether or not the filling pressure peaks; whether or not the filling pressure pulsates; and whether or not the filling pressure varies between shots, during the filling step.

If the filling pressure peaks during the filling step, especially at an earlier stage in the filling step (see the solid line in FIG. 6), nozzle clogging is occurring, and the target temperature is too low. Therefore, when the filling pressure peaks during the filling step, the determining part 718 determines that nozzle clogging is occurring and that the target temperature is inadequate.

If the filling pressure pulsates or varies between shots during the filling step (see the solid line and the dashed line in FIG. 7), drooling is occurring, and the target temperature is too high. Therefore, if the filling pressure pulsates or varies between shots during the filling step, the determining part 718 determines that the target temperature is inadequate.

Note that, in this embodiment, the determining part 718 determines the adequacy the target temperature is adequate, but the worker himself/herself may determine the adequacy of the target temperature as well. That is, although the adequacy of the target temperature is determined automatically in this embodiment, it is equally possible to determine the adequacy of the target temperature manually. When determining the adequacy of the target temperature manually, for example, the display control part 720 of the control device 700 (see FIG. 3) displays the results of monitoring by the monitoring part 717 on the display device 760.

The worker can determine the adequacy of the target temperature by viewing the results of monitoring by the monitoring part 717 displayed on the display device 760. The contents displayed on the display device 760 include, for example, the waveform of actual values of the filling pressure, its virtual waveform, and so forth (see FIG. 6). The virtual waveform is, for example, a waveform obtained when good products were produced in the past. The contents displayed on the display device 760 may include multiple waveforms of actual values of the filling pressure so that the variation between shots can be observed.

As shown in FIG. 3, the control device 700 may include a setting changing part 719. The setting changing part 719 changes the setting of the target temperature based on changes in the actual values of the filling pressure monitored by the monitoring part 717. The target temperature, which could only be set by experts in the past, can now be set automatically.

For example, if the filling pressure peaks during the filling step, especially at an early stage in the filling step (see the solid line in FIG. 6), nozzle clogging is occurring, and the target temperature is too low, and therefore the setting changing part 719 changes the setting of the target temperature higher. The setting of the target temperature may be changed by a fixed amount, or may be changed by an amount to match the height of the peak. In the latter case, the higher the height of the peak, the larger the amount by which the setting of the target temperature is changed. The setting changing part 719 may repeat changing the setting of the target temperature until the peak of the filling pressure at an early stage in the filling step disappears.

If there is a pulsation of filling pressure during the filling step (see the solid line and the dashed line in FIG. 7), drooling is occurring and the target temperature is too high, and therefore the setting changing part 719 changes the setting of the target temperature to a lower value. Here, in the pulsation of filling pressure during the filling step, the filling pressure rises and falls periodically, and has small peaks and small valleys. The setting of the target temperature may be changed by a fixed amount, or may be changed by an amount to match the amplitude of the pulsation. In the latter case, the larger the amplitude of the pulsation, the larger the amount by which the setting of the target temperature is changed. In this embodiment, the amplitude of pulsation is obtained from the difference between the actual waveform and the virtual waveform. Note that the amplitude of pulsation may also be determined from, for example, the difference between a given peak and a given valley in the pulsation. The setting changing part 719 may repeat changing the setting of the target temperature until the pulsation of the filling pressure during the filling step disappears.

When the filling pressure varies between shots during the filling step (see the solid line and the dashed line in FIG. 7), drooling is occurring and the target temperature is too high, and therefore the setting changing part 719 changes the setting of the target temperature lower. Note that whether drooling is occurring may be determined based on whether or not the filling pressure pulsates during the filing step, or based on the magnitude of amplitude. The setting of the target temperature may be changed by a fixed amount, or may be changed by an amount to match the amplitude of pulsation. In the latter case, the larger the amplitude of pulsation, the larger the amount by which the setting of the target temperature is changed. The setting changing part 719 may repeat changing the setting of the target temperature until the pulsation of the filling pressure during the filling step disappears.

The setting changing part 719 may repeat changing the setting of the target temperature until the waveform of the filling pressure during the filling step matches the desired waveform. By this means, nozzle clogging or drooling can be resolved when nozzle clogging or drooling occurs. Nozzle clogging and drooling are difficult to identify by inspecting the quality of molded products. However, if it is possible to identify between nozzle clogging and drooling from the waveform of filling pressure, it then becomes easy to resolve them.

The setting changing part 719 changes the target temperature in the (n+1)-th and subsequent molding cycles based on the change of the filling pressure in the n-th molding cycle, for example (where n is a natural number equal to or greater than 1). By this means, nozzle clogging or drooling can be resolved in the (n+1)-th and subsequent molding cycles.

Note that, in this embodiment, the setting changing part 719 changes the setting of target temperature, but the worker himself/herself may change the setting of target temperature as well. That is, although the setting of target temperature is changed automatically in this embodiment, it is equally possible to change the setting of target temperature manually.

For example, the worker may change the setting of target temperature by viewing the results of monitoring by the monitoring part 717 displayed on the display device 760. This change of the setting is made as the worker enters the target temperature in an input field on a screen. The worker may repeat changing the setting of target temperature until the waveform of the filling pressure during the filling step matches the desired waveform.

Although embodiments of the control device for an injection molding machine and the control method for the injection molding machine according to the present invention have been described above, the present invention is not limited to the above embodiments. Various changes, modifications, substitutions, additions, deletions, and combinations are possible within the scope of the claims. These also naturally belong to the technical scope of the present invention.

What is claimed is:

1. A control device for an injection molding machine, the control device comprising:

processing circuitry configured to monitor, during a filling step of filling an inside of a mold device with a molding material, a change in a filling pressure acting on the molding material, wherein the processing circuitry is configured to monitor, as the change in the filling pressure, at least one of whether the filling pressure peaks when a foremost position of the molding material is forced out of a nozzle provided at a tip of a cylinder to inject the molding material into the mold device or whether there is a pulsation of the filling pressure, the pulsation being recurring small peaks and small valleys of the filling pressure, during the filling step.

2. The control device for the injection molding machine according to claim 1, wherein the processing circuitry is further configured to determine an adequacy of at least one of a temperature of the nozzle or a temperature of the cylinder, based on the monitored change in the filling pressure.

3. The control device for the injection molding machine according to claim 1, wherein the processing circuitry is configured to monitor a peak of the filling pressure caused by nozzle clogging at an early stage of the filling step in a case of monitoring whether the filling pressure peaks when the foremost position of the molding material is forced out of the nozzle, the nozzle clogging being a phenomenon in which the molding material is not injected from the nozzle even when the filling step is started and an injection member is moved forward.

4. The control device for the injection molding machine according to claim 1, wherein the processing circuitry is further configured to change a setting of at least one of a temperature of the nozzle or a temperature of the cylinder, based on the monitored change in the filling pressure.

5. The control device for the injection molding machine according to claim 4, wherein the processing circuitry is configured to change the setting of the temperature higher when the filling pressure peaks during the filling step.

6. The control device for the injection molding machine according to claim 5, wherein an amount of changing the setting of the temperature corresponds to a height of the peak of the filling pressure.

7. The control device for the injection molding machine according to claim 6, wherein the amount of changing the setting of the temperature increases as the height of the peak increases.

8. The control device for the injection molding machine according to claim 4, wherein the processing circuitry is configured to change the setting of the temperature lower when the filling pressure pulsates during the filling step.

9. The control device for the injection molding machine according to claim 8, wherein an amount of changing the setting of the temperature corresponds to an amplitude of the pulsation of the filling pressure.

10. The control device for the injection molding machine according to claim 9, wherein the amount of changing the setting of the temperature increases as the amplitude of the pulsation increases.

11. The control device for the injection molding machine according to claim 1, wherein the processing circuitry is further configured to display, on a display device, a waveform of actual values of the filling pressure as a result of monitoring the change in the filling pressure and an ideal waveform of the filling pressure.

12. A method of controlling an injection molding machine, the method comprising monitoring, during a filling step of filling an inside of a mold device with a molding material, a change in a filling pressure acting on the molding material, wherein said monitoring monitors, as the change in the filling pressure, at least one of whether the filling pressure peaks when a foremost position of the molding material is forced out of a nozzle provided at a tip of a cylinder to inject the molding material into the mold device or whether there is a pulsation of the filling pressure, the pulsation being recurring small peaks and small valleys of the filling pressure, during the filling step.

* * * * *